United States Patent [19]

Tipton

[11] Patent Number: 5,726,507
[45] Date of Patent: Mar. 10, 1998

[54] TEMPORARY ELECTRICAL INTERFACES, INSTALLATIONS, PROCESSES, AND SYSTEMS FOR CONTRUCTION SITES

[75] Inventor: James D. Tipton, Mansfield, Tex.

[73] Assignee: Basic Resources, Inc., Dallas, Tex.

[21] Appl. No.: 591,255

[22] Filed: Jan. 19, 1996

[51] Int. Cl.$^6$ ...................................................... H02G 9/00
[52] U.S. Cl. .......................... 307/147; 174/38; 174/45 R; 361/601; 361/641; 361/622
[58] Field of Search ................................. 307/147, 150, 307/42; 361/622, 625, 627, 601, 602, 626–631, 641; 174/37, 38, 39, 45 R

[56] References Cited

U.S. PATENT DOCUMENTS

| | | | |
|---|---|---|---|
| 4,155,108 | 5/1979 | Tuttle et al. | 361/622 |
| 4,785,376 | 11/1988 | Dively | 361/622 |
| 5,212,623 | 5/1993 | Wilson et al. | 361/625 |
| 5,335,160 | 8/1994 | Savoca | 362/431 |
| 5,378,058 | 1/1995 | Tessmer | 312/298 |
| 5,400,212 | 3/1995 | Hanson | 361/665 |
| 5,404,266 | 4/1995 | Orchard et al. | 361/667 |
| 5,544,003 | 8/1996 | Vaughan | 361/625 |

*Primary Examiner*—Brian Sircus
*Assistant Examiner*—Jonathan Kaplan
*Attorney, Agent, or Firm*—R. Darryl Burke; Worsham, Forsythe & Wooldridge

[57] ABSTRACT

An electrical interface provides a permanent electrical facility electrically connected to a temporary electrical facility which provides electrical utilities to construction sites which can be activated by a non-utility qualified individual. The electrical interface generally comprises (a) permanent electrical facilities that provide electrical power to a residential neighborhood; and (b) temporary electrical facility electrically connected to the permanent electrical facilities. The temporary electrical facility provide electrical utilities to construction sites which can be activated by a non-utility qualified individual(s). The temporary electrical facility further comprises a non-conductive housing and a base, electrical connectors, and a electrical converter. The nonconductive housing fits over and closes the base. Alternate temporary electrical facilities comprise a pole, electrical connectors, and an electrical converter. Electrical connectors are positioned on an exterior surface of the non-conductive housing or pole. The electrical connectors having a connection switching element, which is familiar to an electrician and easily activated. The electrical converter converts the first interface wiring to the second interface wiring. The first interface wiring electrically connects the electrical converter to the permanent electrical facilities, whereas the second interface wiring electrically connects the connection switching element of the electrical connectors to the electrical converter. Preferred processes of installing the electrical interface generally comprise digging a trench and placing the conduit holding the electrical cable therein. And, if necessary, the additional step of digging a hole may be added to hold the preferred embodiment. Also, if needed, the existing cover is removed and replaced with an appropriate cover for the particular structure.

41 Claims, 8 Drawing Sheets

TEMPORARY ELECTRICAL INTERFACES, INSTALLATIONS, PROCESSES, AND SYSTEMS FOR CONTRUCTION SITES

© Copyright. 1996. Basic Resources, Inc. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

FIELD OF INVENTION

The present invention generally relates to the field of electrical equipment used by electrical utilities and their customers, and particularly relates to electrical equipment and facilities used to provide electrical interfaces to electrical utilities and related systems and methods.

SUMMARY

The disclosed invention pertains to an apparatus and related methods and systems that are used to provide an interface to the electric utility's facilities/equipment (e.g., transformers, pedestal and hand holes). Standard preferred embodiments allow a non-utility qualified or authorized individual to make the necessary electrical connections to activate power to a construction site without compromising the existing or future utility services in any way.

Preferred embodiments generally comprise (a) permanent electrical facilities that provide electrical power to a residential neighborhood; and (b)a temporary electrical facility that is electrically connected to the permanent electrical facilities. The temporary electrical facility provides electrical utilities to construction sites which can be activated by a non-utility qualified individual(s). A preferred embodiment of the temporary electrical facility further comprises a non-conductive housing and a base, electrical connectors, and an electrical converter. Alternate preferred embodiments of temporary electrical facilities comprise a pole, electrical connectors, and an electrical converter. The nonconductive housing in the first preferred embodiment fits over and closes the base. Electrical connectors (e.g., hard wired contacts, manual and electronic switches, breakers, and plug-in devices) are positioned on an exterior surface of the non-conductive housing or pole. The electrical connectors have a connection switching element, such as a plug-in device, which is familiar to an electrician and easily activated. The electrical converter converts the first interface wiring to the second interface wiring. The first interface wiring electrically connects the electrical converter to the permanent electrical facilities, whereas the second interface wiring electrically connects the connection switching element of the electrical connectors to the electrical converter. The non-conductive housing and/or pole is(are) preferably comprised of materials selected from the group consisting of fiberglass and assorted polymers, including plastics. The connectors are energized after the second interface wiring has been connected to the electrical connectors and secured to the electrical connectors by an electrician. In addition, the electrical connectors preferably comprise a disconnect mechanism that selectively electrically connects to the second interface wiring. The disconnect mechanism is connected by the electrician as well. The electrical connectors are secured to the non-conductive housing and/or pole with tamper resistant hardware to prevent disassembly in the field. The first interface wiring and the second interface wiring are preferably encased in hollow conduit. The temporary electrical facility and the permanent electrical facility are electrically connected together by conductive cable encased in conduit. Securing hardware secures an internal wiring harness to hold the conduit and a distribution block in place to distribute energy from the second interface wiring to the electrical connectors.

Preferred processes of installing preferred embodiments generally comprise digging a trench and placing the conduit holding the electrical cable therein. If necessary, the additional step of digging a hole may be added to hold the preferred embodiment. Also, if applicable, the existing cover is removed and replaced with an appropriate cover for the particular structure, several of which were described above.

Preferred embodiments provide a number of advantages. Preferred embodiments are retrievable, reusable, and easily assembled and installed. Preferred embodiments reduce the time required to provide electrical power to construction sites. Specifically, preferred embodiments eliminate the necessity of sending crews to the location to provide construction/temporary service that enables the electric utility to eliminate approximately 50% of the trips normally needed at a location, since the builder's electrician (or other authorized personnel) can actually connect the service pole when using the preferred embodiments. This effectively provides energy to the site and interconnects the site to the electrical utility system without any involvement from the utility company whatsoever. In light of the fact that the largest portion of the time delay associated with providing power to construction sites is attributed to the time it takes to notify and get the utility crew to the location to make the needed electrical connections to energize the service, any improvements that streamline this process dramatically reduce the overall time allotment as well. This substantially reduces the overall costs, since the utility crew is only needed to connect the permanent service when construction is complete. Consequently, preferred embodiments expedite the start of construction for the builder and enable electric utility companies (and/or alternate suppliers of electricity) to restructure their rates and to lower costs by using flat rate pricing and block use energy costing. In addition, this ability virtually eliminates the need to meter the usage of electricity of builders and to monthly bill builders, which represents a fundamental and dramatic change in the way electric utilities have operated and billed customers for decades. The savings pertaining to manpower alone are tremendous. Moreover, for both the builder and the electric utility company, preferred embodiments simplify crew scheduling and coordination as well as simplify records and paperwork, which reduces costs and saves money for the electric utility company, the builder, and, ultimately, the consumer.

Other advantages of the invention and/or inventions described herein will be explained in greater detail below.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein.

DETAILED DESCRIPTION OF THE PREFERRED EMBODIMENT

The present inventions will be described by referring to apparatus and methods showing various examples of how the inventions can be made and used. When possible, like reference characters are used throughout the several views of the drawing to indicate like or corresponding pans.

Residential neighborhoods are developed in any one of a variety of ways. For instance, some neighborhoods have alleys, whereas other neighborhoods do not. Some neighborhoods bring in electrical service from the front, whereas other neighborhoods bring in electrical service from the rear. Consequently, it is important for all electrical equipment that is used to provide electrical facilities to neighborhoods be flexible, so as to conform and to meet the needs of each development. FIGS. 1, 2, 3, and 4 show typical arrangements of residential neighborhoods and facilities needed to provide electrical utility services to each planned or existing dwelling (e.g., a house) on each lot. Electric service in an underground system is generally provided using the following methods and apparatus: (1) directly from a transformer secondary compartment; and (2) indirectly from a subsurface enclosure commonly referred to as a "hand hole" that is primarily a sub-ground structure or a pedestal that is primarily an above-ground structure. Examples of transformer secondary compartments are padmounted transformers, which are shown as a square as padmounted transformer 115 in FIG. 1, padmounted transformer 215 in FIG. 2, padmounted transformer 315 in FIG. 3, or padmounted transformer 415 in FIG. 4. Likewise, examples of subsurface enclosures are hand hole or pedestal power supplies, which are shown as a triangle as hand hole or pedestal power supplies 105A–105E in FIG. 1, hand hole or pedestal power supplies 205A–205B, hand hole or pedestal power supplies 305A–305E in FIG. 3, or hand hole or pedestal power supplies 405A–405B in FIG. 4. Note, in FIGS. 1–4, power fines electrically connecting the transformer, as referenced above, to an enclosure, as referenced above, are shown as a solid line from enclosure to enclosure and are referred to as secondaries or secondary power lines (e.g. secondaries or secondary power lines 110A–110E in FIG. 1, secondaries or secondary power lines 210A–210B in FIG. 2, secondaries or secondary power lines 310A–310E in FIG. 3, and secondaries or secondary power fines 410A–410B in FIG. 4). The service portion of the system of the power line leaves the transformer and/or enclosure to satisfy the energy needs of customers (including builders) and is shown by broken lines in FIGS. 1–4 (e.g., individual dwelling power fines 135A–135L in FIG. 1, individual dwelling power fines 235A–235L in FIG. 2, individual dwelling power fines 335A–335L in FIG. 3, and individual dwelling power fines 435A–435L in FIG. 4). The secondary power lines and service power lines are hardwired systems requiring cables and connectors. Cables and connectors are generally designed for bulk energy applications in the range of 75 to 420 amperes. The services are sized for a single customer and the secondaries for multiple customers. The enclosures and transformers are preferably tamper resistant and are designed to prevent entry by unauthorized individuals (e.g., children).

Figure 1:
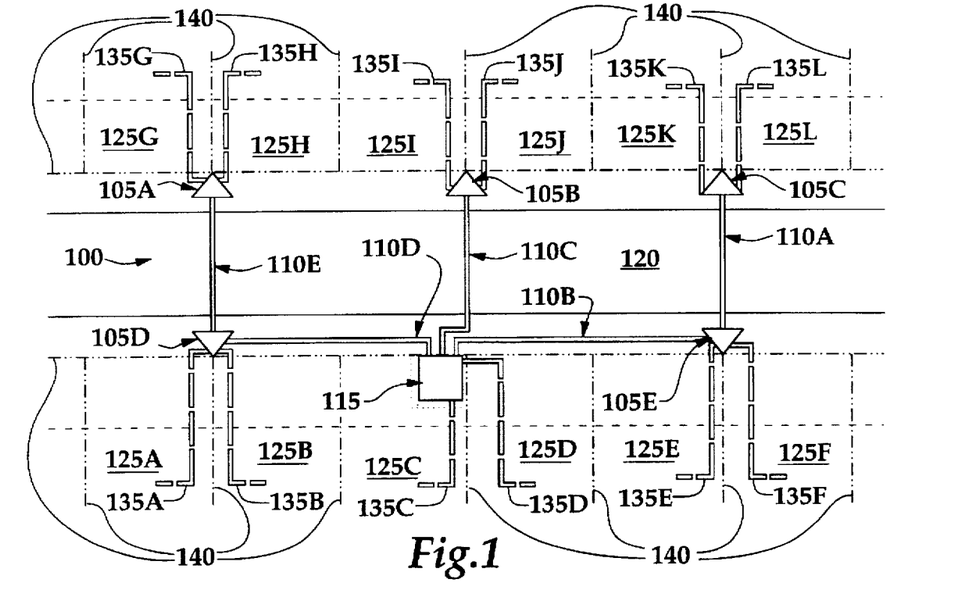
FIG. 1 illustrates typical front-lot arrangement 100 showing the corresponding arrangement of secondary power fines 110A–110E, hand hole or pedestal power supplies 105A–105E, padmounted transformer 115, street 120, the individual power fines 135A–135L to each planned or existing dwelling on each lot 125A–125L outlined by the property fines 140.

More specifically, FIG. 1 illustrates typical front-lot arrangement 100 showing the corresponding arrangement of secondary power fines 110A–110E, hand hole or pedestal power supplies 105A–105E, padmounted transformer 115, street 120, the individual dwelling power lines 135A–135L to each planned or existing dwelling on each lot 125A–125L, outlined by the property lines 140. Note the position of street 120 in relation to lots 125A–125L. Each hand hole or pedestal power supplies 105A–105E provide electrical service to dwellings when constructed on two lots via individual power lines 135A–135L, which are generally buried. Hand hole or pedestal power supplies 105A–105E fan out from padmounted transformer 115 in small groups. In addition, individual power line 135C and 135D fan out directly from padmounted transformer 115. In particular, hand hole or pedestal power supplies 105A and 105D are electrically connected together via secondary power line 110E and to padmounted transformer 115 via secondary power line 110D. Similarly, hand hole or pedestal power supply 105B is electrically connected to padmounted transformer 115 via secondary power line 110C. Hand hole or pedestal power supples 105C and 105E are electrically connected together via secondary power line 110A and to padmounted transformer 115 via secondary power line 110B.

Figure 2:
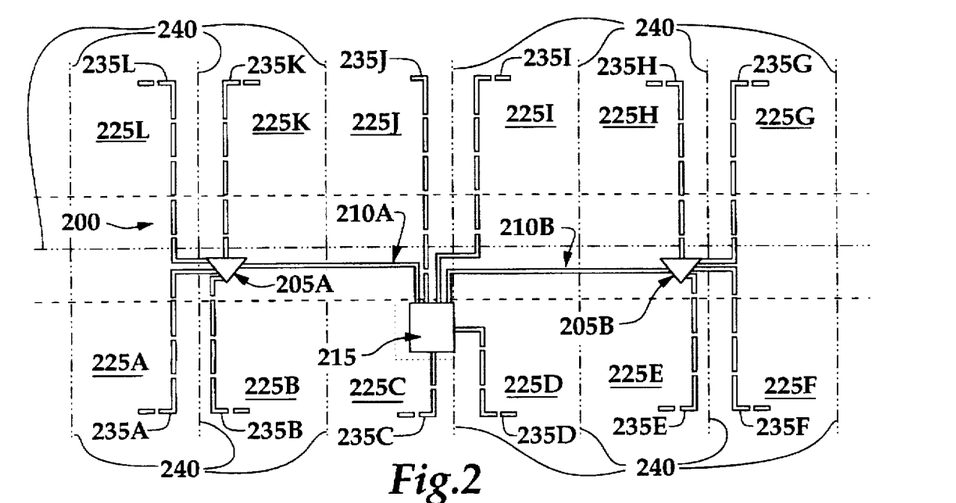
FIG. 2 illustrates typical rear-lot easement arrangement 200 showing the corresponding arrangement of secondary power lines 210A–210B, hand hole or pedestal power supplies 205A–205B, padmounted transformer 215, the individual power lines 235A–235L to each planned or existing dwelling on each lot 225A–225L outlined by the property lines 240.

FIG. 2 illustrates typical rear-lot easement arrangement 200 showing the corresponding arrangement of secondary power fines 210A—210B, hand hole or pedestal power supplies 205A–205B, padmounted transformer 215, the individual dwelling power fines 235A–235L to each planned or existing dwelling on each lot 225A–225L, outlined by the property fines 240. Note the position of arrangement of lob 225A–225L adjacent to one another and the absence of street or alley. Each hand hole or pedestal power supplies 205A–205B provide electrical service to dwellings when constructed (not shown) on four lots via individual power fines 235A–235L, which are buried. Hand hole or pedestal power supplies 205A–205B fan out from padmounted transformer 215 in small groups. In addition, individual power lines 235C, 235D, 235I, and 235J also fan out directly from padmounted transformer 215. In particular, hand hole or pedestal power supply 205A is electrically connected to padmounted transformer 215 via secondary power fine 210A. Similarly, hand hole or pedestal power supply 205B is electrically connected to padmounted transformer 215 via secondary power line 210B.

Figure 3:
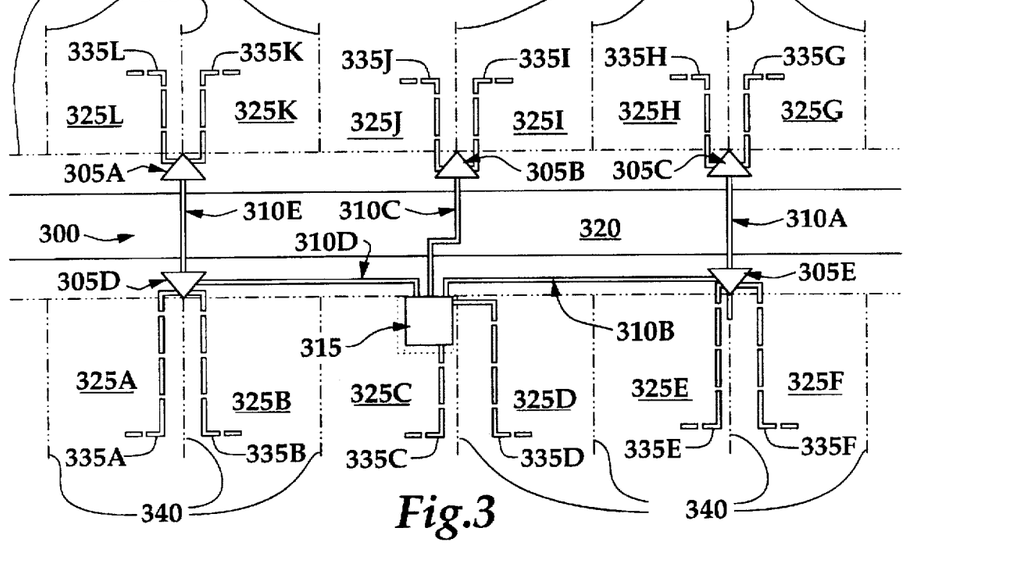
FIG. 3 illustrates typical rear-lot paved alley arrangement 300 showing the corresponding arrangement of secondary power lines 310A–310E, hand hole or pedestal power supplies 305A–305E, padmounted transformer 315, paved alley 320, individual power lines 335A–335L to each planned or existing dwelling on each lot 325A–325L, outlined by the property lines 340.

FIG. 3 illustrates typical rear-lot paved alley arrangement 300 showing the corresponding arrangement of secondary power fines 310A–310E, hand hole or pedestal power supplies 305A–305E, padmounted transformer 315, paved alley 320, the individual dwelling power lines 335A–335L to each dwelling on each lot 325A–325L, outlined by the property fines 340. Note the position of paved alley 320 in relation to lots 325A–325L. Each hand hole or pedestal power supplies 305A–305E each provide electrical service to dwellings (not shown) on two lots via individual power fines 335A–335L, which are buried. Hand hole or pedestal power supplies 305A–305E fan out from padmounted transformer 315 in small groups. In addition, individual power lines 335C, 335D, 225I, and 335J fan out from padmounted transformer 415. In particular, hand hole or pedestal power supplies 305A and 305D are electrically connected together via secondary power line 310E and to padmounted transformer 315 via secondary power line 310D. Similarly, hand hole or pedestal power supply 305B is electrically connected to padmounted transformer 315 via secondary power line 310C. Hand hole or pedestal power supples 305C and 305E are electrically connected together via secondary power line 310A and to padmounted transformer 315 via secondary power line 310B.

Figure 4:
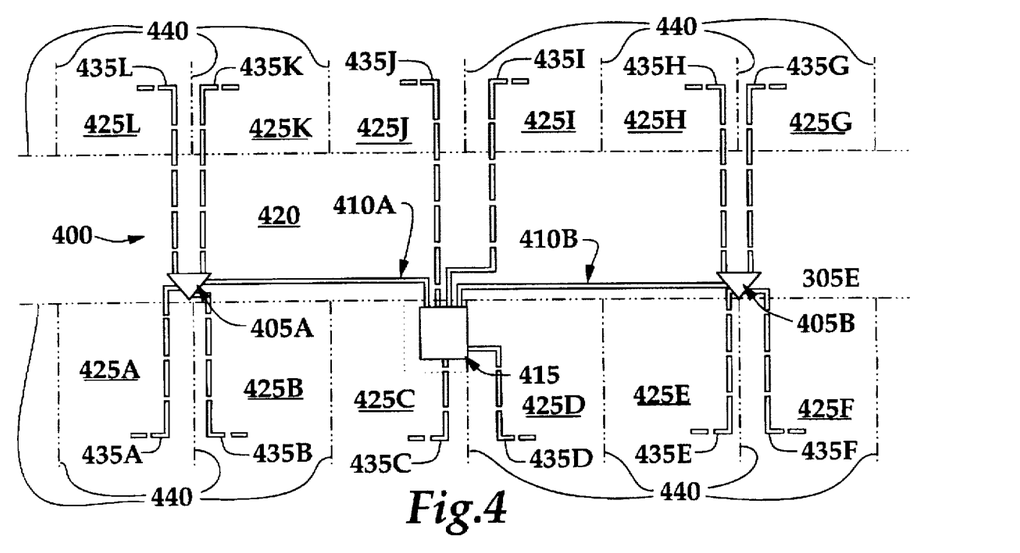
FIG. 4 illustrates typical rear-lot unpaved alley arrangement 400 showing the corresponding arrangement of secondary power lines 410A–410B, hand hole or pedestal power supplies 405A–405B, padmounted transformer 415, unpaved alley 420, the individual power lines 435A–435L to each planned or existing dwelling on each lot 425A–425L, outlined by the property lines 440.

FIG. 4 illustrates typical rear-lot unpaved alley arrangement 400 showing the corresponding arrangement of secondary power lines 410A–410B, hand hole or pedestal power supplies 405A–405B, padmounted transformer 415, unpaved alley 420, the individual dwelling power lines 435A–435L to each planned or existing dwelling on each lot, outlined by the property lines 440. Note the position of arrangement of lots 425A–425L adjacent to one another in relation to the unpaved alley 420. Hand hole or pedestal power supplies 405A–405B each provide electrical service to dwellings when constructed (not shown) on four lots via individual power lines 435A–435L, which are buried. Hand hole or pedestal power supplies 405A–405B fan out from padmounted transformer 415 in small groups. In addition, individual power lines 435C, 435D, 435I, and 435J also fan out directly from padmounted transformer 415. In particular, hand hole or pedestal power supply 405A is electrically connected to padmounted transformer 415 via secondary power line 410A. Similarly, hand hole or pedestal power supply 405B is electrically connected to padmounted transformer 415 via secondary power line 410B.

Electrical utility services are generally broken up into two distinct types of service: (1) the construction service and (2)

the permanent service. The construction service is generally viewed as a temporary electric utility service that supplies the energy needed to construct the permanent structure and facilities. The energy needs for construction service are usually significantly less than the energy needs required for the permanent service. Facilities providing permanent service are sized to meet the energy needs of the occupant of the structure and facility and remain in place after the facilities used to provide temporary electric utility service are removed. Consequently, electrical equipment should be designed such that it can be used to provide construction service quickly, readily, and cheaply, but also easily converted to provide permanent service by modifying existing equipment, removing existing equipment, or adding additional equipment.

Figures 5A, 5B:
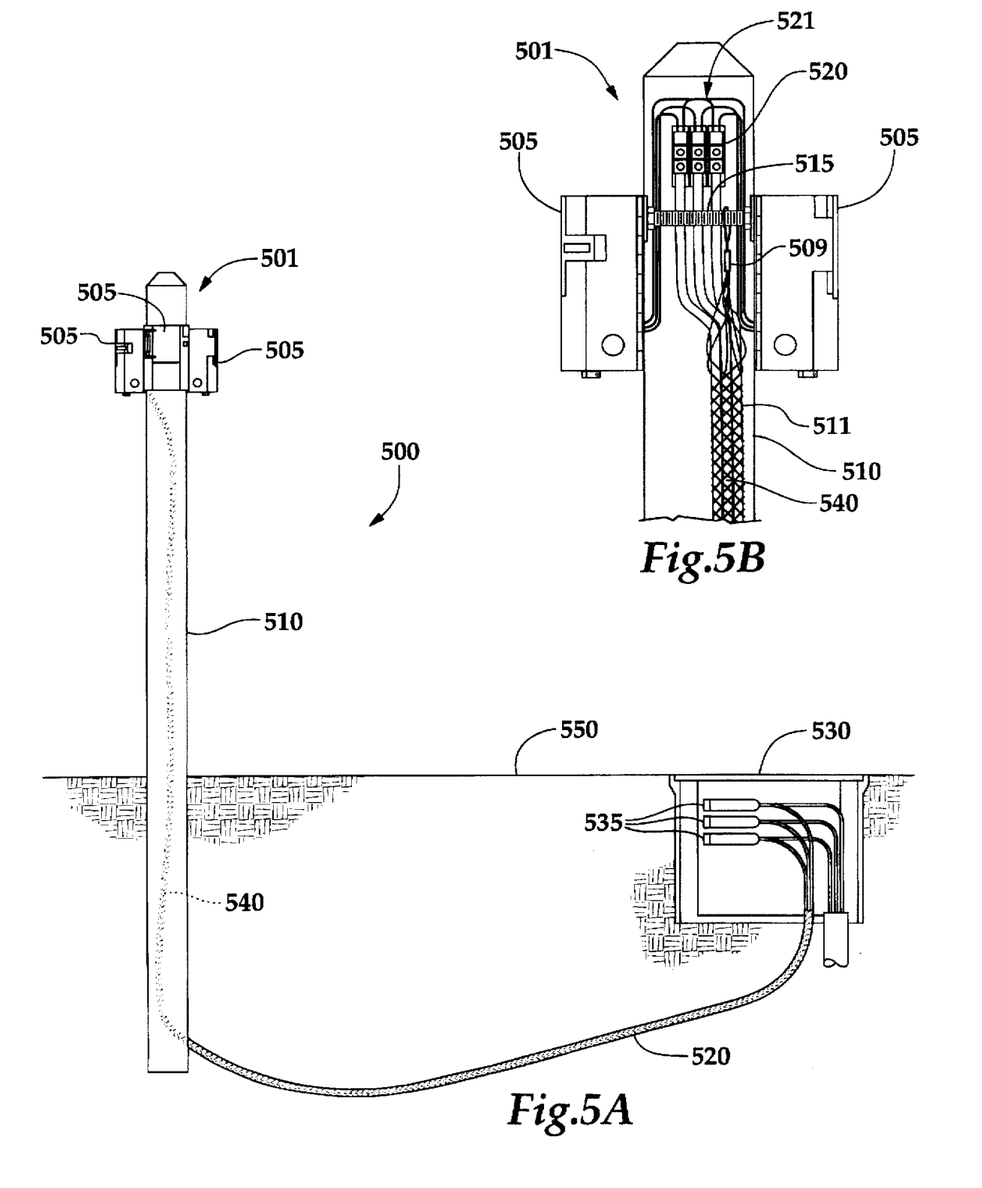
FIG. 5A illustrates a cross-sectional diagram of a stand alone unit 500 in relation to ground level 550 that has pole 510, a plurality of electrical housed connectors 505 positioned on various sides of pole 510, buffed flexible conduit 520, hand hole 530 having a plurality of electrical connectors 535 therein and electrical cable 540 extending through buffed flexible conduit 520 and through pole 510 to electrical housed connectors 505 to selectively electrically connect electrical connectors 535 and housed electrical connectors 505.
FIG. 5B illustrates an enhanced, cross-sectional diagram of the top portion 501 of stand alone unit 500 having pole 510, a plurality of electrical connectors 505 positioned on various sides of pole 510.
Figures 6A, 6B:
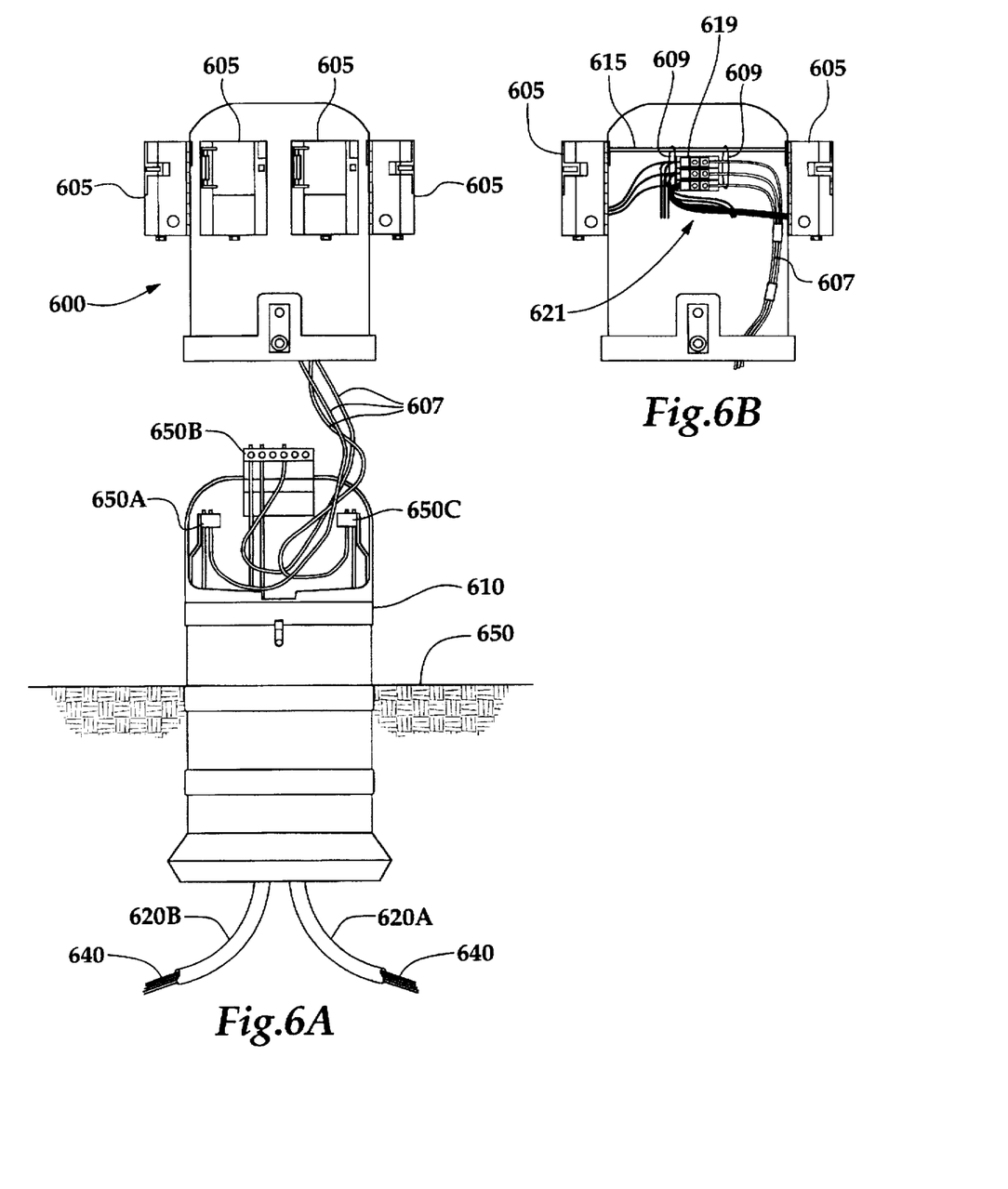
FIGS. 6A and 6B illustrates a modification to pedestal cover 600 and pedestal base 610 in relation to ground level 650 in which pedestal cover 600 has a plurality of housed electrical connectors 605 positioned on exterior surface which are electrically connected to electrical connectors 650A, 650B, and 650C in pedestal base 610 via electrical cables 607 and to electrical cables 640 which are placed in buried conduit 620A–620B.
Figure 7A:
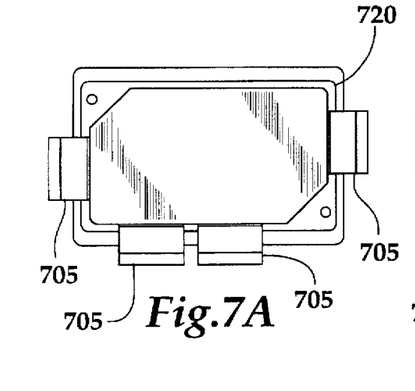
FIG. 7A illustrates a top view of lid 720 which has been specially designed to hold at least one housed electrical connector 705 which are electrically connected to connectors 7:35 via electrical cable 707.
Figure 7B:
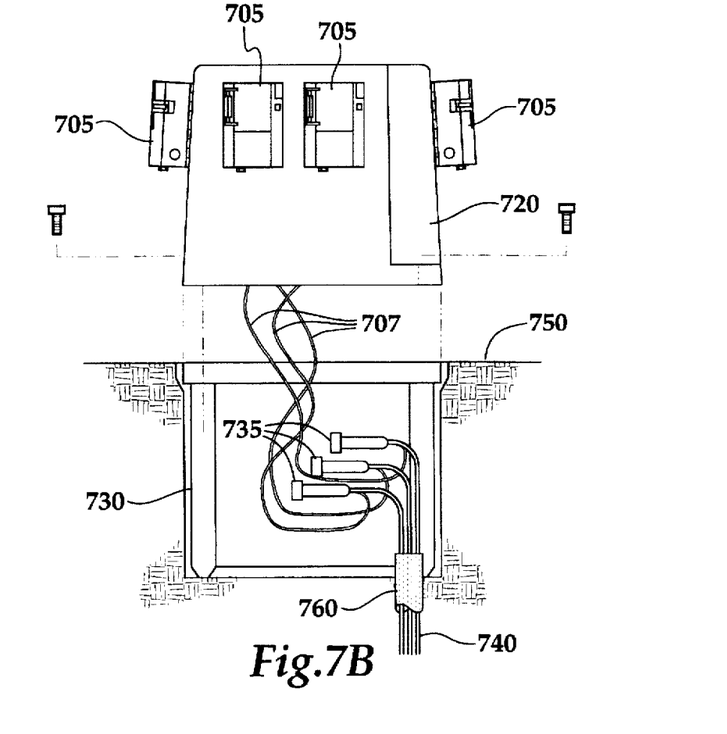
FIG. 7B illustrates a cross-sectional view of hand hole 730 in relation to ground level 750 in which cover or lid 720 has been specially designed to hold at least one housed electrical connector 705 which are electrically connected to electrical connectors 735 via electrical cable 707, and in which hand hole 730 has buried conduit 760 entering hand hole 730 with electrical cable 740 placed therein.
Figure 7C:
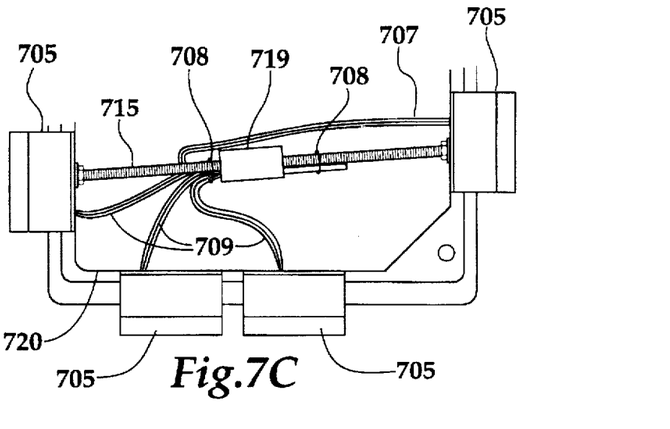
FIG. 7C illustrates a cross-sectional view of the gripping mechanism 708 used to secure electrical cable 707 together along with a top level view of lid 720 and housed electrical connectors 705.
Figure 8A:
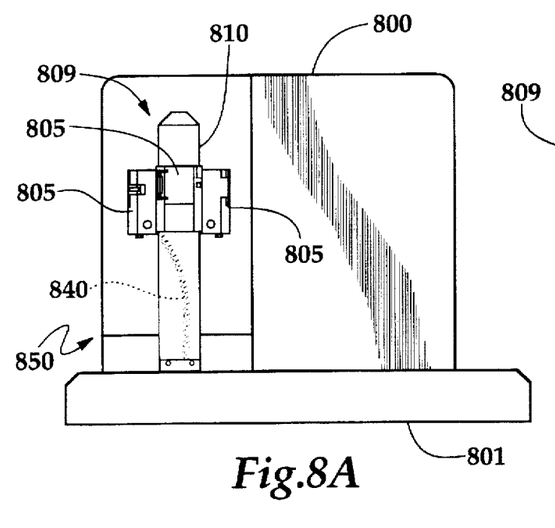
FIGS. 8A and 8B illustrate cross-sectional views from different angles of an add-on interface unit 850 for a transformer 800 on pad 801 in which transformer 800 is electrically connected to housed electrical connectors 805 via cable 840 enclosed in pole 810 and joint 812 and stabilizer 832 to stabilize pole 810.
Figure 8B:
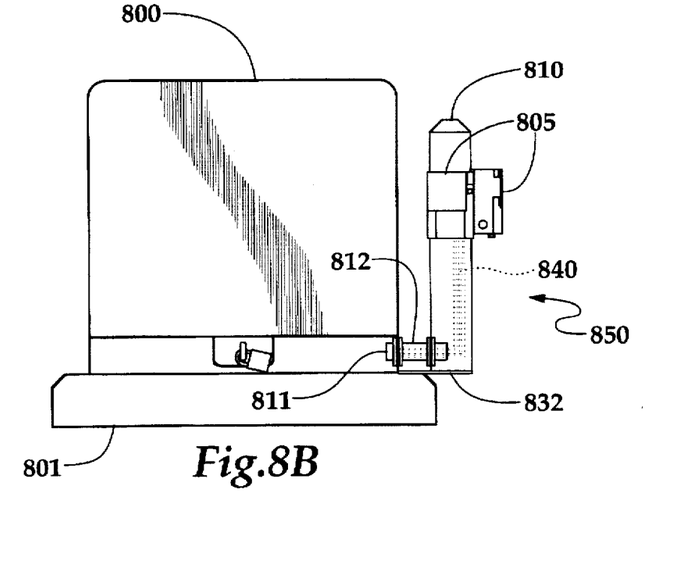
Figure 8C:
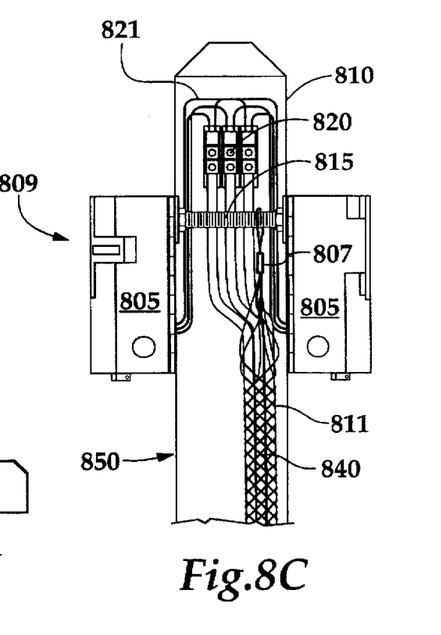
FIG. 8C illustrates a cross-sectional view of enhanced portion 809 of add-on interface unit 850.
Figures 9, 10:
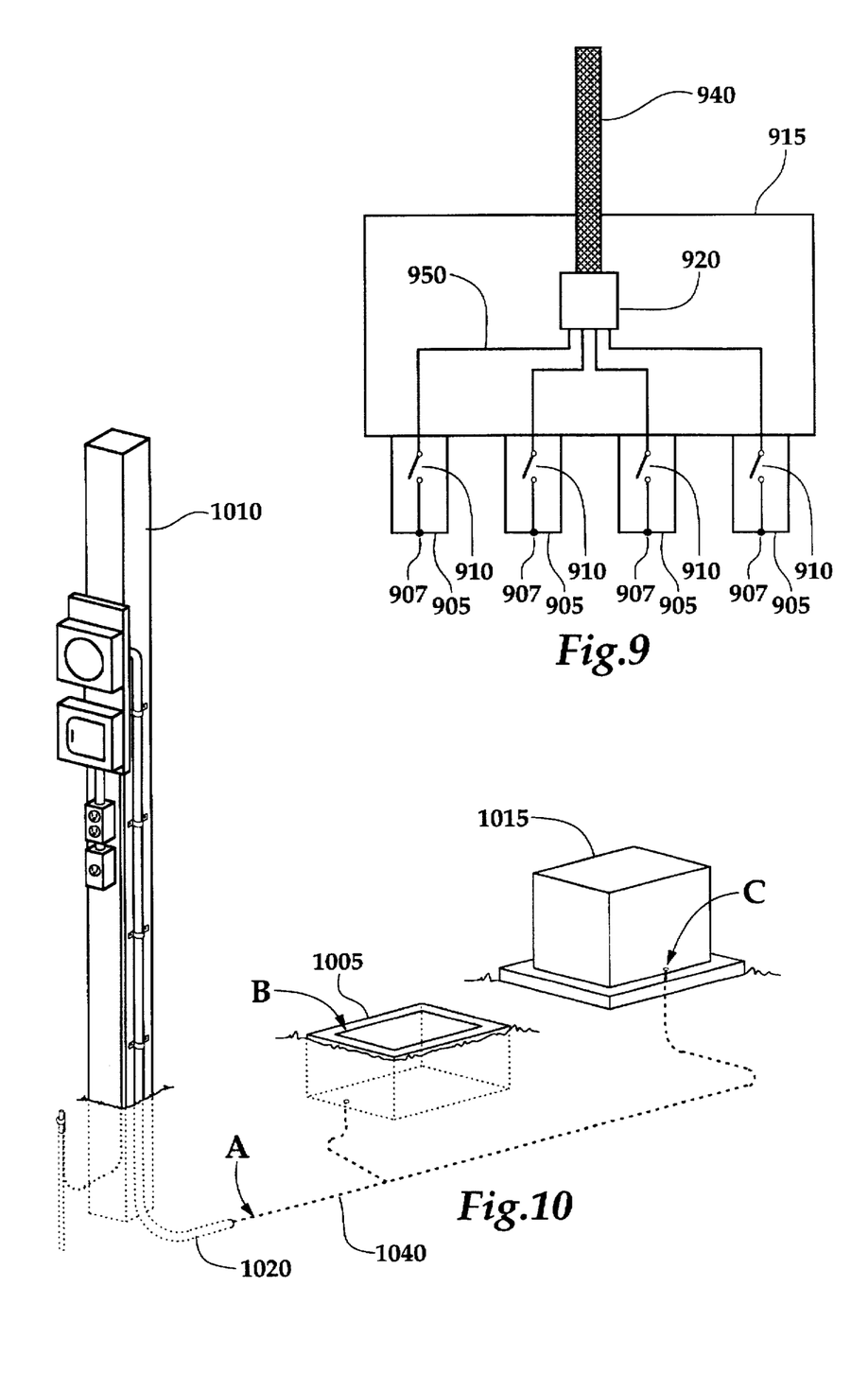
FIG. 9 illustrates a simplified wiring diagram of utility connecting cable 940, which is similar to that cable 540 in FIGS. 5A and 5B, cable 640 in FIGS. 6A and 6B, distribution block 920 (enclosed in interface housing 915) and a plurality of housed electrical connectors 905, which are similar to housed electrical connectors 505 (in FIGS. 5A and 5B), housed electrical connectors 605 (in FIGS. 6A and 6B), housed electrical connectors 705 (in FIGS. 7A, 7B, and 7C), having service connection points 907 that are selectively electrically connected to distribution block 920 via service energizing elements 910.
FIG. 10 illustrates a temporary service pole 1010 from underground secondary that is electrically connected to hand hole 1005 and/or transformer 1015 (via cables 1040) and the relative placement of the stand alone unit 500 (denoted by letter "A") shown in FIGS. 5A and 5B, modified hand hole cover 720 (denoted by letter "B"), shown in FIGS. 7A, 7B and 7C, or add-on unit 850 (denoted by letter "C"), shown in FIGS. 8A, 8B and 8C.
Figures 11A, 11D, 11E:
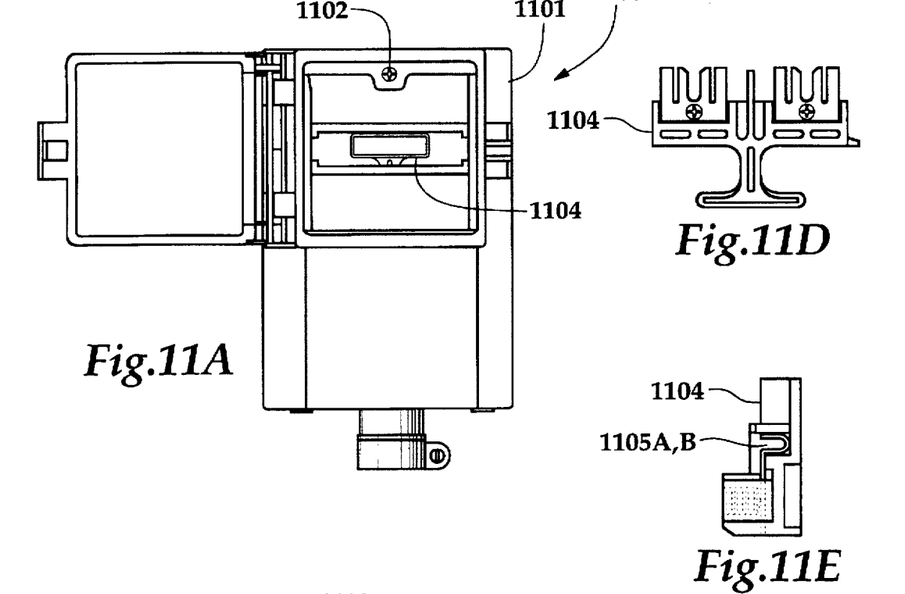
FIGS. 11A–11E show the preferred housed electrical connectors 1100 used as housed electrical connectors 505 (in FIGS. 5A and 5B), housed electrical connectors 605 (in FIGS. 6A and 6B), housed electrical connectors 705 (in FIGS. 7A, 7B and 7C) and electrical connectors 805 (in FIGS. 8A, 8B and 8C) having, removable non-metallic cover 1101, cover securing screw 1102, jumper 1104 and a plurality of screw terminals 1106A, 1106B, and 1106C which are electrically connected to a plurality of recessed jumper contacts 1105A and 1105B, wiring 1103 which electrically connects distribution block 920 (in FIG. 9) to screw terminals 1106A, termination safety screw-on cap 1108 and electrical steel flexible steel conduit termination connector 1107 and wire shielding feed thru wiring element shield 1109.
Figure 11B:
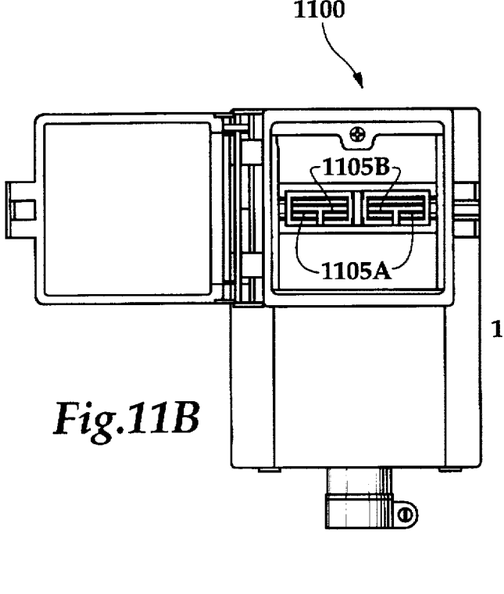
Figure 11C:
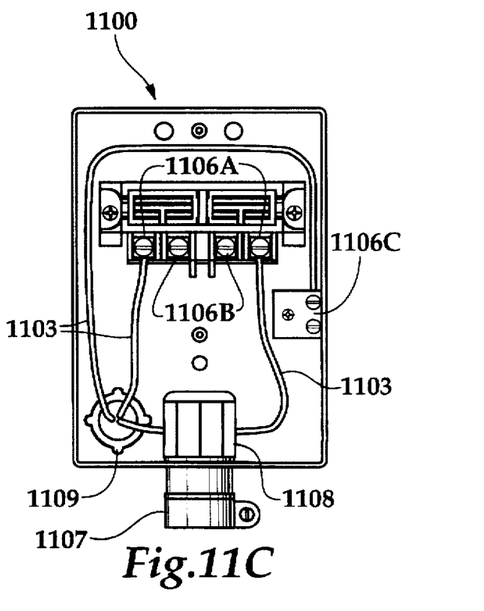

FIG. 10 illustrates a temporary service pole 1010 from underground secondary that is electrically connected to hand hole 1005 and/or transformer 1015 (via cable(s) 1040) and the relative placement of the stand-alone unit 500 (denoted by letter "A") shown in FIGS. 5A and 5B, or modified hand hole cover 720 (denoted by letter "B") shown in FIGS. 7A, 7B, and 7C, or add-on transformer interface unit 850 (denoted by letter "C") shown in FIGS. 8A, 8B, and 8C. The electric utility's permanent equipment and secondary circuits (e.g., transformer 1015 and hand hole (or pedestal) 1005 and necessary cables) are generally installed during the early stages of property development. Without the use of preferred embodiments, when the builder is ready to begin construction, his electrician sets a construction/temporary service pole 1010 in dose proximity to the electric utility's facilities (e.g., transformer 1015 hand hole (or pedestal) 1005), so that temporary service can be easily activated and supplied. A builder then applies for the construction service to the electric utility and also requests an inspection of the service pole 1010 by the local governing electrical authority (usually the city). Then, after approval by the local electrical inspection authority, the builder requests the electric utility service company to connect the construction/temporary service pole 1010 into the grid used to deliver electricity (e.g., to transformer 1015, or hand hole (or pedestal) 1005). The electrical utility then issues an order to a crew to go to the location and connect the service by energizing service pole 1010. The cable 1040 for the service pole connection is provided by the builder and is part of the electrical inspection. The actual connecting of cable 1040 is made by the electrical utility's crew to ensure that system integrity is not compromised. Coordinating the inspection and activation generally takes a considerable amount of time and effort and contributes to the overall inefficiency of providing energy to construction sites. Preferred embodiments streamline this process considerably. FIGS. 5A-5B, 6A-6B, 7A-7C, 8A-8C, and 11A-11E illustrate a number of alternative preferred embodiments that will be described below in relation to FIG. 10. FIG. 10 shows the actual physical placement of these embodiments in relation to the transformer 1015, which is usually owned by the electric utility company, and pole 1010, which is usually an approved outdoor service switch, breaker box, or breaker box/receptacle combination.

FIG. 5A illustrates a cross-sectional diagram of a stand alone unit 500 in relation to ground level 550 that has pole 510, a plurality of housed electrical connectors 505 positioned on various (exterior) sides of pole 510, buried flexible conduit 520, hand hole 530 having a plurality of electrical connectors 535 therein and electrical cable(s) 540 extending through buried flexible conduit 520 and through pole 510 to housed electrical connectors 505 to selectively electrically connect connectors 535 and housed electrical connectors 505. FIG. 5B illustrates an enhanced, cross-sectional diagram of the top portion 501 of stand alone unit 500 having pole 510, a plurality of electrical housed connectors 505 positioned on various sides of pole 510. The preferred embodiment shown in FIGS. 5A and 5B is installed as a stand alone unit 500 at position A (in FIG. 10) in close proximity to the electric utilities equipment (e.g., hand hole 530 in FIG. 5A or transformer 1015 and hand hole 1005 in FIG. 10). While FIG. 5A shows the stand alone unit 500 being used with a hand hole 530, it can also be used with a pedestal or transformer, such as padmounted transformer 1015 in FIG. 10. Stand alone unit 500 utilizes flexible conduit 520, which is generally buried, to house electrical cables 540 to serve as the interface utility connection wiring. Conduit 520 is flexible corrugated type conduit and extends from the stand alone unit 500 to hand hole 530. Conduit 520 allows the interface and wiring to be easily retrieved as well as installed and reused without having to dig up electrical cable 540 (along with conduit 520). In addition, note that pole 510 is hollow and also holds electrical cables 540 (and a portion of conduit 520), which effectively isolates electrical cables 540 from the environment to reduce environmental wear and tear on electrical cables 540 (and conduit 520) and to minimize the dangers associated with electricity (e.g., it is harder for children and workers to get access and to damage the electrical cables 540, especially when buried and encased in conduit 520). The use of pole 520 also makes the electrical cables 540 retrievable without digging up the entire electrical cables 540. Note the preferred embodiment shown in FIGS. 5A and 5B has a slot cut at the bottom edge of pole 510. The width of the slot is cut slightly smaller than the groove diameter of the conduit and extends about twice the diameter of the conduit up the base of pole 510. This slot allows conduit 520 to slide up the slot to secure it to pole 510. When pole 510 is retrieved, it is pulled out of the ground and conduit 520 slides out of the slot of pole 510 and remains in the ground. The interconnecting wiring contained within conduit 520 and pole 510 will slide through conduit 520 and remain attached to housed electrical connector 505, but within pole 510. As shown in FIG. 5B, electrical cables 540 are preferably held together as a single unit with netting 511, which has an attachment mechanism 509 (e.g., a hook or loop) that attaches electrical cables 540 to rod 515. Each end of rod 515 is attached to an interior surface of pole 510 or extends through pole 510 to form mounting elements for housed electrical connectors 505 and to secure rod 515 in place (along with electrical cables 540). This configuration also produces some slack in electrical cables 540, which makes the overall configuration easier to work with. Distribution block 520 is also secured to an interior surface of pole 510 with an adhesive or screws. Distribution block 520 receives electrical cables 540 and then distributes energy via additional electrical cables 521 to housed electrical connectors 505. Distribution block 520 is shown in greater detail in FIG. 9 and employs a screw contact system similar to that shown in FIG. 11C and discussed in the text corresponding to FIG. 11C.

The installation procedure for the preferred embodiment shown in FIG. 5A comprises the following steps: (a) locating and positioning stand alone unit 500 dose to hand hole, pedestal or padmounted transformer, such as hand hole 530 in FIGS. 5A or hand hole 1005 or padmounted transformer 1015 in FIG. 10; (b) digging a hole in which to place the bottom portion of pole 510 and digging a trench for conduit 520 to hand hole 530, pedestal or padmounted transformer; (c) setting pole 510 in a hole and laying in conduit 520 housing cables 540 to hand hole 530 or to pedestal or padmounted transformer; (d) backing in and/or filling-in dirt around the base of stand alone unit 500 and the trench and tamping it in; and (e) connecting and interconnecting electrical cables 540 to connectors 535 which connects stand alone unit 500 to the power system. The removal procedures for stand alone unit 500 are generally comprised of the following steps: (a) disconnecting electrical cables 540 from electrical connectors 535 and (b) pulling stand alone unit 500 out of the ground. Conduit 520 will automatically disconnect itself from stand alone unit 500 and electrical cables 540 will slide through conduit 520 and remain attached to stand alone unit 500.

Similar to the preferred embodiment shown in FIGS. 5A and 5B, FIGS. 8A and 8B illustrate cross-sectional views from different angles of an add-on interface unit 850 for a transformer 800 on pad 801 in which transformer 800 is electrically connected to housed electrical connectors 805 via cable 840 and closed in pole 810 and joint 812 and stabilizer 832 to stabilize pole 810. FIG. 8C illustrates a cross-sectional view of enhanced portion 809 of add-on interface unit 850. The preferred embodiment shown in FIGS. 8A and 8B utilizes existing mounting or transformer lifting pads and/or ports (holes) which are part of the electrical utility's equipment (e.g., transformer 800). In the illustrated case, add on interface unit 850 utilizes the construction/temporary service entrance port 811 on the transformer's cabinet sill. Electrical cables 840 extend outward from the circuitry embedded in transformer 800 via joint 812 into pole 810, which is hollow and non-conductive. Pole 810 and joint 812 houses electrical cables 840, which effectively isolates electrical cables 840 from the environment to reduce environmental wear and tear on electrical cables 840 and to minimize the dangers associated with electricity. Housed electrical connectors 805 are placed on an exterior surface of pole 810 and are selectively electrically connected to electrical cable 840. Stabilizer 832 extends outward under joint 812 and underneath pole 850 and is also secured under transformer 800. Pole 810 rests on stabilizer 832. Add-on interface unit 850 is preferably placed at position C in FIG. 10. Once again, as shown in FIG. 8C, electrical cables 840 are preferably held together as a single unit with netting 811, which has an attachment mechanism 807 (e.g., a hook or loop) that attaches electrical cables 840 to rod 815. Each end of rod 815 is attached to an interior surface of pole 810 or extends through pole 810 to form mounting elements for housed electrical connectors 805 and to secure rod 815 in place (along with electrical cables 840). This configuration also produces some slack in electrical cables 840, which makes the overal configuration easier to work with. Distribution block 820 is also secured to an interior surface of pole 810 with an adhesive or screws. Distribution block 820 receives electrical cables 840 and then distributes energy via additional electrical cables 821 to housed electrical connectors 805. Distribution block 820 is shown in greater detail in FIG. 9 and employs a screw contact system similar to that shown in FIG. 11C and discussed in the text corresponding to FIG. 11C.

Referring again to FIG. 8B, the installation procedures comprise the following steps of (a) inserting the interface unit's (add-on unit's 850) interconnecting wiring (electrical cables 840) through the construction/temporary services entrance port on the transformer cabinet sill; (b) lining the interconnecting wiring pipe (joint 812) up to the port and sliding the pole stabilizer plate 832 under the sill and seat the pipe in the port and secure it to the transformer 800 with provided hardware; (c) placing pole having electrical connectors positioned on an exterior surface of the pole (add-on unit 850) on the pole stabilizer plate 832; and (d) connecting the interconnecting wiring (electrical cables 840) to the transformer's secondary connectors. Removal procedures are generally comprised of the following steps of (a) disconnecting the interconnecting wiring (cable 840) from the transformer's secondary connectors; (b) disconnecting the securing hardware holding the interconnecting wiring pipe to the transformer; (c) sliding the add-on unit 850 away from the transformer 800; and (d) securing the transformer's construction/temporary secondary service port by bolting a closing plate over the opening.

FIGS. 6A and 6B illustrates a modification to pedestal cover 600 and pedestal base 610 in relation to ground level 650 in which pedestal cover 600 has a plurality of housed electrical connectors 605 positioned on exterior surface which are electrically connected to connectors 650A, 650B, and 650C in pedestal base 610 via electrical cables 607 and to electrical cables 640 which are placed in buried conduit 620A–620B. The pedestal's cover or lid 600 is preferably of sufficient size and is comprised of non-conductive (e.g., non-metallic and non-conductive) material and the pedestal cover or lid 600 is a separable and replaceable item. In this preferred embodiment, housed electrical connectors 605 are placed on an exterior surface (or another accessible surface or position) of pedestal cover 600 and are electrically connected to electrical cable 640 via wiring 607 and electrical connectors 650A, 650B and 650C. As noted above, electrical cable 640 in conduits 620A and 620B electrically connects electrical connectors 650A, 650B and 650C to other electrical utility facilities (e.g., transformer 1015 in FIG. 10). The preferred embodiment shown in FIGS. 6A and 6B actually replace typical pedestals used in position B (where hand hole 1005 is placed) in FIG. 10. Also, note referring to FIG. 6B, electrical cables 607 are taped together and/or tied together and secured in place with an attachment mechanism 609 (e.g., hook or loop) that attaches the electrical cables 607 to rod 615. Once again, each end of rod 615 is secured to an interior surface of pedestal cover 600 or extends through pole 810 to form mounting elements for housed electrical connectors 805 and to secure rod 615 in place (along with electrical cables 640). Distribution block 619 is also secured to an interior surface of pedestal cover 600 with an adhesive or screws. Distribution block 619 receives electrical cables 607 and distributes energy via additional electrical cables 621 to connectors 605. Distribution block 619 is shown in greater detail in FIG. 9 and employs a screw contact system similar to that shown in FIG. 11C and discussed in the text corresponding to FIG. 11C.

Referring again to FIG. 6A, the installation procedures are generally comprised of the following steps (a) removing the existing pedestal cover; (b) connecting the pedestal interface unit's interconnecting wiring (wiring 607) to the pedestal base connectors 650A, 650B, and 650C; and (c) sliding on the interface unit 600 and securing interface unit 600 with hardware. The removal procedures generally comprise the following steps: (a) unbolting and sliding off the pedestal unit 600 and (b) disconnecting the pedestal interface unit's interconnecting wiring (wiring 607) from the pedestal base connectors 650A, 650B, and 650C; and (c) installing standard pedestal cover on pedestal base, if desired.

FIG. 7A illustrates a top view of lid 720 which has been specially designed to hold at least one hundred electrical connector 705 which is electrically connected to connectors 735 via electrical cable 707. Similarly, FIG. 7B illustrates a cross-sectional view of hand hole 730 in relation to ground level 750 in which cover or lid 720 has been specially designed to hold at least one hundred electrical connector 705 which is electrically connected to electrical connectors 735 via electrical cable 707, and in which hand hole 730 has buried conduit 760 entering hand hole 730 with electrical cable 740 placed therein. And, FIG. 7C illustrates a cross-sectional view of the gripping mechanism 708 (cable ties) used to secure electrical cable 707 together along with a top level view of lid 720 and housed electrical connectors 705. Note housing 720 would be placed over hand hole 1005 at position B shown in FIG. 10. Electrical cable 740 in conduit 760 electrically connect electrical connectors 735 to other electrical utility facilities (e.g., transformer 1015 in FIG. 10). Electrical connectors 735 are also electrically connected to electrical wiring 707 that electrically connect to housed electrical connectors 705. Referring to FIG. 7C, electrical cables 707 are secured in place with an gripping mechanism 708 (e.g., hook, loop, or cable ties) that attaches the electrical cables 707 to rod 715. Each end of rod 715 is secured to an interior surface of lid 720 or extends through lid 720 to form mounting elements for housed electrical connectors 705 and to secure rod 715 in place (along with electrical cables 707). Distribution block 719 is also secured to rod 715. Distribution block 719 receives electrical cables 707 and distributes energy via additional electrical cables 709 to housed electrical connectors 705. Distribution block 719 is shown in greater detail in FIG. 9 and employs a screw contact system similar to that shown in FIG. 11C and discussed in the text corresponding to FIG. 11C.

Referring again to FIG. 7B, the installation procedures are as follows: (a) removing existing hand hole lid; (b) connecting interface housing unit interconnecting wiring (electrical cables 707) to electrical connectors 735 in hand hole 730; and (c) sliding housing unit (lid 720) into the lid mounting area on hand hole 730 and securing housing unit (lid 720) with hardware. The removal procedures are as follows: (a) unbolting and sliding off interface housing unit (lid 720); (b) disconnecting the interface housing unit's interconnecting wiring from the electrical connectors 735 in hand hole 730; and (c) installing standard hand hole lid on the hand hole 730.

FIG. 9 illustrates a simplified wiring diagram of utility connecting cable 940, (which is similar to that cable 540 in FIGS. 5A and 5B, cable 607 in FIGS. 6A and 6B, cable 707 in FIGS. 7A, 7B, and 7C, and cable 840 in FIGS. 8A, 8B, and 8C), distribution block 920 (enclosed in interface housing 915 similar to pole 510 in FIGS. 5A and 5B, pedestal cover 600 in FIGS. 6A and 6B and cover lid 720 in FIGS. 7A, 7B, and 7C) and a plurality of housed electrical connectors 905, which are similar to connectors 505 (in FIGS. 5A and 5B) electrical connectors 605 (in FIGS. 6A and 6B) electrical connectors 705 (in FIGS. 7A, 7B, and 7C), having service connection points 907 that are selectively electrically connected to distribution block 920 via internal electrical wires 950 and service energizing element 910. Note distribution block 920 is secured in place by tape, an adhesive, or screws, such as shown in FIGS. 5A–5B, 6A–6B, and 7A–7C, wherein distribution block 920 is secured in place to an interior surface of the housing (e.g., with a support, bracket, bracelet) or to a rod. Alternatively, as shown in FIGS. 5A–5B and 8A–8C, an attachment mechanism, such as a cable grip, can be used to secure the cables going out of distribution block 920 in order to stabilize distribution block 920.

FIGS. 11A–11E show the preferred housed electrical connectors 1100 used as electrical connectors 505 (in FIGS. 5A and 5B), 605 (in FIG. 6A and 6B), 705 (in FIGS. 7A, 7B, and 7C), and 805 (in FIGS. 8A, 8B, and 8C). Housed electrical connector 1100 is preferably a commercially available air-conditioning disconnect switch to which has been added wiring element shield 1109, a screw-on safety cap 1108 and steel flexible conduit terminator 1107. The screw-on safety cap 1108 screws onto steel flexible conduit terminator 1107 to prevent anyone (child!) from pushing anything up into the wiring or screw terminal area. Wiring element shield 1109 protects wiring 1103 as wiring 1103 is taken from connector housing 1101 and through the interface housing to distribution block 920 (in FIG. 9). Wiring 1103 electrically connects distribution block 920 to screw terminals 1106A. Screw terminals 1106A are electrically connected to recessed jumper contacts 1105A. Screw terminals 1106B are electrically connected to recessed jumper contacts 1105B. Recessed jumper contacts 1105A are electrically connected to recessed jumper contacts 1105B when jumper 1104 is inserted into the recessed jumper contacts. This action electrically connects screw terminals 1106B to the terminals 1106A. This action energizes screw terminals 1106B. The jumper 1104 has two positions—an "off position" in which the jumper contacts are nested in slots above the recessed jumper contacts and an "on position" in which the jumper contacts are pushed and seated in the recessed jumper contacts 1105A and 1105B. The recessed jumper contacts 1105A and 1105B are paired elements and electrically isolated from one another (2-1105A and 2-1105B contacts). Jumper 1104 is a two-piece jumper arrangement such that when inserted into the recessed jumper contacts it will electrically connect one contact 1105A to one contact 1105B, thus completing the electrical energizing path to the set of screw terminals 1106B. Screw terminal 1106C is this ground wire connecting terminal.

Preferred processes that are generally performed by the builder's electrician to electrically connect and energize the electric service to the temporary service facility are comprised of the following steps. The electrician brings the service pole service conduit 1020 shown in FIG. 10 containing the service pole service wires to housed electrical connects 1100 shown in FIGURES I 1A–11E. The electrician removes jumper 1104, unscrews cover securing screw 1102, pulls off cover 1101, thus exposing the internal wiring of the connecting element. The electrician removes safety screw-on cap 1108 and inserts service pole conduit 1020 into the steel flexible conduit terminator 1107 and secures it to the connecting element by tightening the terminator's clamping bolt. The service pole wiring 1040 is then connected to the screw terminals 1106B and to ground terminal 1106C. Normally there are three wires: 2 "hot wires" and a ground wire. The service pole service wires are now electrically connected to the connecting element. The element cover 1101 is snapped back onto the unit and secured with the cover securing screw 1102. Jumper 1104 is then inserted into the recessed jumper contacts 1105A and 1105B thus energizing the temporary service pole 1010.

FURTHER MODIFICATIONS AND VARIATIONS

Although the invention has been described with reference to a specific embodiment, this description is not meant to be construed in a limiting sense. The example embodiments shown and described above are only intended as an example. Various modifications of the disclosed embodiment as well as alternate embodiments of the invention will become apparent to persons skilled in the art upon reference to the description of the invention. For instance, there can be numerous designs and variations on the interfacing housings all based on the fundamental concepts discussed above. In addition to the interface housing variations, there can also be numerous means and designs to allow the energizing and connecting of the construction/temporary service. Examples of alternate connecting elements would be plug-in, set screw terminal, spade/lug terminal, and screw terminals. Examples of energizing elements would be plug-in, plug jumper, manual disconnect switch, and breakers, both manual and electrically operated. Moreover, while the above discussion was primarily directed toward an underground system, the same concept would also apply to service from an overhead type system, even though the wiring and connecting elements may need to be modified in the above-ground systems. Note, while the above discussion generally described electrical connections as "connections," or being "connected," they may also be electrically coupled. Likewise, connectors can be couplers.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed is:

1. An electrical interface, comprising:
  (a) a permanent electrical facility that provides electrical power to a residential neighborhood; and
  (b) a temporary electrical facility electrically coupled to said permanent electrical facility, said temporary electrical facility provides electrical power to a construction site in said residential neighborhood, said temporary electrical facility further comprises
    (b1) a non-conductive housing and a base, said non-conductive housing covers said base, said non-conductive housing and said base forming an interior space that is substantially enclosed by said non-conductive housing and said base, said non-conductive housing also having an exterior space that is exterior to said non-conductive housing and said base, said non-conductive housing having an exterior surface;
    (b2) a connection switching element electrically coupled to an electrical connector to selectively activate said electrical connector, said connection switching element and said electrical connector positioned in said exterior space of said non-conductive housing proximate to said exterior surface of said non-conductive housing; and
    (b3) an electrical converter to convert first interface wiring to second interface wiring, said electrical convertor is positioned in said interior space, said first interface wiring electrically coupled between said electrical converter and said permanent electrical facility, said second interface wiring electrically coupled between said connection switching element and said electrical converter, so that said connection switching element selectively activates said electrical connector by selectively electrically coupling said second interface wiring to said electrical connector, wherein said base has a first hollow cavity that is buried substantially underground and said non-conductive housing has a second hollow cavity that is substantially above ground when said non-conductive housing is positioned over said base to cover said base to create said interior space, and further wherein said first interface wiring is substantially encased in conduit until said first interface wiring enters said interior space.

2. The electrical interface of claim 1, wherein said connection switching element is selected from a group consisting of hard wired contacts, manual switches, electronic switches and breakers and plug-in devices.

3. The electrical interface of claim 1, wherein said non-conductive housing is comprised of materials selected from a group consisting of fiberglass and assorted polymer technologies and plastics.

4. The electrical interface of claim 1, wherein said electrical connector is energized after said second interface wiring has been connected to said connection switching element and secured to said connection switching element.

5. The electrical interface of claim 1 wherein said connection switching element further comprises a disconnect mechanism to selectively electrically connect said second interface wiring to said electrical connector.

6. The electrical interface of claim 1, wherein said electrical converter is secured to said non-conductive housing and enclosed in said interior space created by said non-conductive housing and said base, said base and said non-conductive housing attached together with tamper resistant hardware.

7. The electrical interface of claim 1, wherein said first interface wiring is substantially encased in conduit, said conduit extending from said permanent electrical facility to said temporary electrical facility.

8. The electrical interface of claim 7, further comprising securing hardware and wherein said electrical converter further comprises a distribution block, said securing hardware to secure an internal wiring harness to hold said distribution block in place, said distribution block to distribute said second interface wiring to said electrical connector via said connection switching element.

9. The electrical interface of claim 1, further comprising:
  (c) third interface wiring; and
  (d) a second temporary electrical facility electrically coupled to said electrical connector via said third interface wiring, said third interface wiring extending from said electrical connector to said second temporary electrical facility.

10. The electrical interface of claim 9, wherein said second temporary electrical facility comprises
  (c1) a pole;
  (c2) a meter positioned on said pole, said meter electrically connected to said electrical connector via said third interface wiring; and
  (c3) a plug positioned on said pole, said plug electrically connected to said meter, and said plug electrically connected to said electrical connector via said third interface wiring and said meter.

11. The electrical interface of claim 1, wherein said permanent electrical facility is selected from a group consisting of a padmounted transformer, a hand-hole power supply, and a pedestal mounted power supply.

12. The electrical interface of claim 1, wherein said connection switching element is partially enclosed in a second non-conductive housing, said second non-conductive housing positioned on said exterior surface of said non-conductive housing.

13. The electrical interface of claim 12, wherein said second non-conductive housing is secured to said non-conductive housing with tamper resistant hardware.

14. The electrical interface of claim 1, wherein said connection switching element is jumper.

15. A temporary electrical installation, comprising
(a) a non-conductive housing and a base, said non-conductive housing covers said base, said non-conductive housing and said base combine to form a cavity, said non-conductive housing having an exterior surface;
(b) a plug-in connection switching element positioned near said exterior surface of said non-conductive housing, said plug-in connection switching element selectively energizes an electrical connector; and
(c) an electrical converter to convert a first interface wiring to a second interface wiring, said first interface wiring electrically couples said electrical converter to a power supply, said second interface wiring electrically couples said electrical connector to said electrical converter when said plug-in connection switching element is activated, wherein said base has a first hollow cavity that is buried substantially underground and said non-conductive housing has a hollow cavity is substantially above ground when said non-conductive housing is positioned over said base to cover said base to create said cavity, and further wherein said first interface wiring is substantially encased in conduit until said first interface wiring enters said cavity, said first interface wiring and said conduit is buried underground.

16. The temporary electrical installation of claim 15, wherein said non-conductive housing is comprised of materials selected from a group consisting of fiberglass, assorted polymer technologies, and plastics.

17. The temporary electrical installation of claim 15, further comprising securing hardware to secure an internal wiring harness to secure said electrical convertor to an interior surface of said non-conductive housing.

18. The temporary electrical installation of claim 16, further comprising:
(c) third interface wiring; and
(d) a second temporary electrical facility electrically coupled to said electrical converter via said third interface wiring, said plug-in connection switching element, said electrical connector, and said second interface wiring, said third interface wiring extending from said electrical connector to said second temporary electrical facility.

19. The temporary electrical installation of claim 18, wherein said second temporary electrical facility comprises
(c1) a pole;
(c2) a meter positioned on said pole, said meter electrically coupled to said electrical connector via said third interface wiring; and
(c3) a plug positioned on said pole, said plug electrically coupled to said meter and said plug electrically coupled to said electrical connector via said third interface wiring and said meter.

20. The temporary electrical installation of claim 15, wherein said power supply is selected from a group consisting of a padmounted transformer, a hand-hole power supply, and a pedestal mounted power supply.

21. The temporary electrical installation of claim 15, wherein said plug-in connection switching element is substantially enclosed in a second non-conductive housing, said second non-conductive housing positioned on an exterior surface of said exterior surface of said non-conductive housing, said second interface wiring extending through said exterior surface into said second non-conductive housing.

22. The temporary electrical installation of claim 21, wherein said second non-conductive housing is secured to said first non-conductive housing with tamper resistant hardware.

23. A temporary electrical installation, comprising:
(a) a pole;
(b) an electrical switch secured to an exterior surface of said pole; and
(c) an electrical converter to convert first interface wiring to second interface wiring, said first interface wiring electrically couples said electrical converter to an electrical utility distribution system, said second interface wiring electrically couples said electrical switch to said electrical converter, wherein said switch is substantially enclosed in a non-conductive housing, said non-conductive housing positioned on an exterior surface of said pole, said second interface wiring extending through said exterior surface into said non-conductive housing and further wherein said pole is hollow and said first interface wiring extends through said pole.

24. The temporary electrical installation of claim 23, wherein said pole is comprised of materials selected from the group consisting of fiberglass, assorted polymer technologies, and plastics.

25. The temporary electrical installation of claim 23, further comprising securing hardware to secure an internal wiring harness to hold said electrical convertor to an interior surface of said non-conductive housing.

26. The temporary electrical installation of claim 23, wherein said switch is selected from a group consisting of hard wired contacts, manual switches, electronic switches and breaker switches and plug-in jumpers.

27. The temporary electrical installation of claim 23, further comprising:
(c) third interface wiring; and
(d) a second temporary electrical facility electrically coupled to said electrical switch via said third interface wiring, said third interface wiring extending from said electrical switch to said second temporary electrical facility.

28. The temporary electrical installation of claim 27, wherein said second temporary electrical facility comprises
(c1) a pole;
(c2) a meter positioned on said pole, said meter electrically coupled to said electrical switch via said third interface wiring; and
(c3) a plug positioned on said pole, said plug electrically coupled to said meter and said plug electrically coupled to said electrical switch via said third interface wiring and said meter.

29. The temporary electrical installation of claim 23, wherein said electrical convertor is electrically coupled to said electrical utility distribution system via an intermediate power supply, said immediate power supply is electrically coupled to said electrical utility distribution system, so that said first interface wiring extends from electrical convertor to said immediate power supply.

30. The temporary electrical installation of claim 29, wherein said intermediate power supply is selected from a group consisting of a padmounted transformer, a hand-hole power supply, and a pedestal mounted power supply.

31. The temporary electrical installation of claim 23, wherein a first end of said pole is buried and said first interface wiring is encased in conduit when said first interface wiring leaves said pole and a portion of said conduit is positioned in a notch in said first end of said pole.

32. A temporary electrical installation, comprising:
   (a) a non-conductive housing to enclose and to protect an electrical connector, said electrical connector having a first electrical lead and a second electrical, said first electrical lead to selectively electrically couple to an electrical plug, said non-conductive housing having an exterior surface;
   (b) an electrical switch enclosed in said non-conductive housing, said electrical switch partially extending through said exterior surface of said non-conductive housing, so that said electrical switch can be activated from a location exterior of said non-conductive housing, said electrical switch having a first switch lead and a second switch lead, said first switch lead electrically coupled to said second electrical lead of said electrical connector, said second switch lead electrically coupled to an electrical cable which is electrically coupled to a power supply, so that said electrical switch electrically couples said power supply to said electrical connector and to said electrical plug when activated and electrically isolates said electrical connector and said electrical plug from said power supply when deactivated; and
   (c) a non-conductive, hollow pole, said non-conductive housing secured to said non-conductive, hollow pole, said electrical cable extending through said non-conductive, hollow pole to said non-conductive housing.

33. The temporary electrical installation of claim 32, wherein said non-conductive housing is comprised of materials selected from a group consisting of fiberglass, assorted polymer technologies, and plastic.

34. The temporary electrical installation of claim 32, wherein said electrical switch is selected from a group consisting of hard wired contacts, manual switches, electronic switches and breakers and plug-in devices.

35. The temporary electrical installation of claim 32, wherein said electrical cable substantially encased in conduit, said conduit buried and extending from said permanent power supply to said non-conductive, hollow pole.

36. A temporary electrical installation of claim 32, further comprising
   (d) a hinged cover attached to said non-conductive housing to selectively cover said electrical switch extending through said exterior surface of said non-conductive housing.

37. The temporary electrical installation, of claim 32 wherein said non-conductive, hollow pole has a first end that has a notch positioned therein, said notch to hold a portion of a conduit used to encase said electrical cable when said electrical cable leaves said non-conductive, hollow pole.

38. A temporary electrical installation, comprising:
   (a) a first non-conductive housing to enclose and to protect an electrical connector, said electrical connector having a first electrical lead and a second electrical lead, said first electrical lead to selectively electrically couple to an electrical plug, said first non-conductive housing having an exterior surface;
   (b) an electrical switch enclosed in said first non-conductive housing, said electrical switch partially extending through said exterior surface of said first non-conductive housing, so that said electrical switch can be activated from a location exterior of said first non-conductive housing, said electrical switch having a first switch lead and a second switch lead, said first switch lead electrically coupled to said second electrical lead of said electrical connector, said second switch lead electrically coupled to an electrical cable which is electrically coupled to a power supply, so that said electrical switch electrically couples said power supply to said electrical connector and to said electrical plug when activated and electrically isolates said electrical connector and said electrical plug from said power supply when deactivated; and
   (c) a second non-conductive housing, said first non-conductive housing secured to said second non-conductive housing, said electrical cable extending through said second non-conductive housing to said first non-conductive housing.

39. The temporary electrical installation of claim 38, wherein said first non-conductive housing and said second non-conductive housing are comprised of materials selected from a group consisting of fiberglass, assorted polymer technologies, and plastic.

40. The temporary electrical installation of claim 38, wherein said electrical switch is selected from a group consisting of hard wired contacts, manual switches, electronic switches and breakers and plug-in devices.

41. The temporary electrical installation of claim 38, wherein said electrical cable substantially encased in conduit, said conduit buried and extending from said permanent power supply to said second non-conductive housing.

* * * * *